J. G. RIBON.
Cam for Stamp-Mills.
No. 214,954.   Patented April 29, 1879.
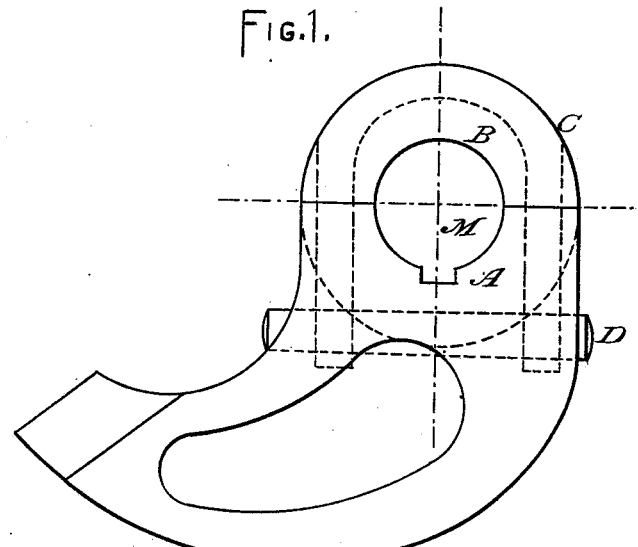
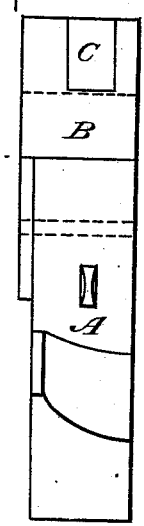
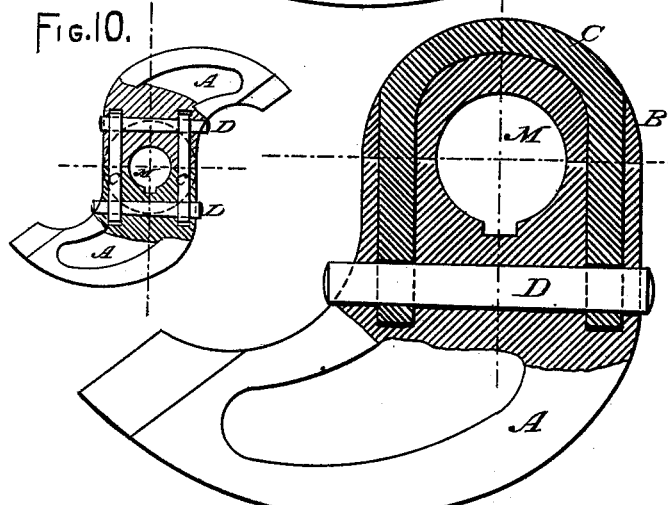
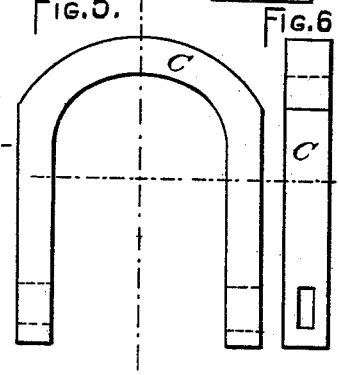
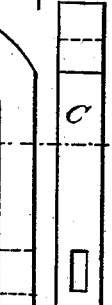
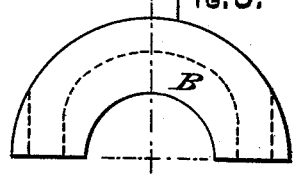
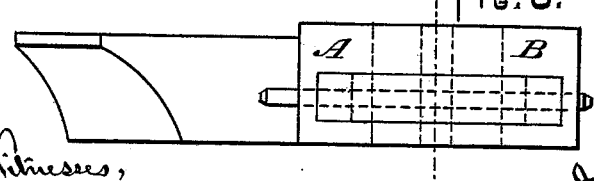
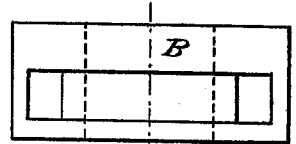

UNITED STATES PATENT OFFICE.

JUAN G. RIBON, OF JERSEY CITY, NEW JERSEY.

IMPROVEMENT IN CAMS FOR STAMP-MILLS.

Specification forming part of Letters Patent No. 214,954, dated April 29, 1879; application filed November 4, 1878.

*To all whom it may concern:*

Be it known that I, JUAN G. RIBON, of Jersey City, Hudson county, State of New Jersey, have invented certain new and useful Improvements relating to Cams or Wipers; and I do hereby declare that the following is a full and exact description thereof.

My improved wiper is intended for use in stamping-mills for crushing ores and in analogous situations. I make the wiper removable by forming it in pieces peculiarly secured together.

My improvement allows the wipers to be worked in a series as close together as is allowed in the present practice with wipers in a single piece, but yet allows each wiper to be taken off and repaired or exchanged without disturbing the other wipers or any other part of the machinery.

The following is a description of what I consider the best means of carrying out the invention.

The accompanying drawings form a part of this specification.

Figure 1 is a side elevation of my wiper complete. Fig. 2 is the same, partly in section. Fig. 3 is a top view, and Fig. 4 an edge view, of the same. Fig. 5 is a side view, and Fig. 6 an edge view, of a soft-steel or strong wrought-iron portion, which is fitted within the other parts, and which I term the "strap." Fig. 7 is a hardened steel or stiff wrought-iron piece smoothly finished with a slight taper. I term this the "key." Fig. 8 is a side view, and Fig. 9 a top view, of one of the cast-iron semi-steel or steel pieces, into which the strap is recessed, and which contributes by the strong force of the strap and key to hold the other—the effective portion of the wiper—rigidly in place on the shaft. Fig. 10 is a section of a modification.

Similar letters of reference indicate corresponding parts in all the figures.

A is the effective portion of the wiper, which may be made in any approved form, but which I have represented as hollowed on each side for lightness, and as suitably shaped at the end to act on a round-faced tappet on the stamper. (Not shown.) This part A is made to embrace only half of the shaft M. A separate piece, B, is provided to embrace the other half of the shaft.

The parts A and B are held together very stoutly by a strap, C, of strong material, let into a recess provided in the part B, and retained in cavities in the part A by means of a cross-key, D, of slight taper, which is driven through slots in the strap C. These parts are shown clearly in Figs. 2, 5, and 6.

The key D must be carefully made with reference to its thickness and length, these being determined by trial or otherwise, so that when driven very tightly home neither end will protrude to any great extent.

In applying the wiper to the shaft, the recess shown in the part which embraces the shaft is intended to fit over a feather formed upon the shaft, or a key which may be placed in position in a recess on the shaft before the wiper is secured in position, by means of the strap C and key D.

The conditions under which wipers often act preclude the possibility of making them in halves, fastened together in any ordinary way, as by flanges and bolts. It is essential that they be confined with great force, and also that the wiper presents no projections from either face to strike the stems, or any other part.

It is frequently necessary to adjust the wipers closely together.

My invention allows the wipers to be crowded, and to work under all conditions which may be required.

It is obvious that this result cannot be obtained with wipers heretofore made in two parts, so constructed that to apply and remove them from the shaft access must be had to the side of the wiper.

Neither end of the key D need project to any great extent, yet the ends are readily accessible for driving in or driving out the key when required to secure or liberate the wiper.

Modifications may be made. Where it shall be required to make a double wiper I can make the part B with an arm corresponding to the part A, and divide the strap C into two straight parts, each end of each being slotted, and providing two keys, with a key-seat in each part. This modification is indicated in Fig. 10.

I claim as my invention—

The wiper described, having the strap C and key D, combined with the parts A B, and let into the same, as herein specified.

In testimony whereof I have hereunto set my hand this 31st day of October, 1878, in the presence of two subscribing witnesses.

JUAN G. RIBON.

Witnesses:
CHAS. C. STETSON,
W. L. BENNEM.